US010298664B2

(12) United States Patent
High et al.

(10) Patent No.: US 10,298,664 B2
(45) Date of Patent: May 21, 2019

(54) SYSTEMS AND METHODS OF CAPTURING AND DISTRIBUTING IMAGING CONTENT CAPTURED THROUGH UNMANNED AIRCRAFT SYSTEMS

(71) Applicant: Walmart Apollo, LLC, Bentonville, AR (US)

(72) Inventors: Donald R. High, Noel, MO (US); John P. Thompson, Bentonville, AR (US); Timothy M. Fenton, Bentonville, AR (US); Erik Rye, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 201 days.

(21) Appl. No.: 15/380,086

(22) Filed: Dec. 15, 2016

(65) Prior Publication Data

US 2017/0180460 A1   Jun. 22, 2017

Related U.S. Application Data

(60) Provisional application No. 62/268,313, filed on Dec. 16, 2015.

(51) Int. Cl.
*G06F 15/16* (2006.01)
*H04L 29/08* (2006.01)
(Continued)

(52) U.S. Cl.
CPC ............ *H04L 67/10* (2013.01); *B64C 39/024* (2013.01); *B64D 47/08* (2013.01); *G06K 9/0063* (2013.01); *H04L 67/04* (2013.01); *H04L 67/142* (2013.01); *H04W 4/046* (2013.01); *B64C 2201/127* (2013.01); *B64C 2201/146* (2013.01); *H04W 4/80* (2018.02); *H04W 84/042* (2013.01); *H04W 84/12* (2013.01); *H04W 88/12* (2013.01)

(58) Field of Classification Search
CPC ... H04L 67/10; H04L 67/04; B64C 2201/127; B64C 2201/146; B64C 39/024; G06K 9/0063; H04W 4/046
See application file for complete search history.

(56) References Cited

U.S. PATENT DOCUMENTS 9,550,577 B1   1/2017 Beckman
9,573,684 B2   2/2017 Kimchi
(Continued)

OTHER PUBLICATIONS

PCT; App. No. PCT/US2016/066491; International Search Report and Written Opinion dated Feb. 24, 2017.

*Primary Examiner* — Mohamed A Wasel
(74) *Attorney, Agent, or Firm* — Fitch, Even, Tabin & Flannery LLP

(57) ABSTRACT

In some embodiments, systems and methods are provided to capture and distribute imaging content. Some embodiments, provide remote inspection systems, comprising: an unmanned aircraft system (UAS) base station control system that wirelessly communicates with an UAS, and comprises: a wireless transceiver; a control circuit; and a memory wherein the control circuit: receives imaging content, captured by a camera of the UAS; establishes a network connection with a content distribution system and activate a distribution session; and communicates the imaging content to the content distribution system that enables multiple remote authorized rendering systems to access the networked content distribution system over the Internet, join the distribution session, and receive over the Internet in real time the imaging content allowing each of the rendering systems to visually play back the imaging content such that a user at each of the multiple rendering systems can watch the imaging content in real time.

22 Claims, 3 Drawing Sheets

(51) Int. Cl.
*B64C 39/02* (2006.01)
*B64D 47/08* (2006.01)
*G06K 9/00* (2006.01)
*H04W 4/04* (2009.01)
*H04W 4/80* (2018.01)
*H04W 84/04* (2009.01)
*H04W 84/12* (2009.01)
*H04W 88/12* (2009.01)

(56) References Cited

U.S. PATENT DOCUMENTS

| | | | |
|---|---|---|---|
| 2005/0012033 A1* | 1/2005 | Stern | G01T 1/2928 |
| | | | 250/214 R |
| 2005/0015508 A1 | 1/2005 | Hankejh | |
| 2008/0144884 A1 | 6/2008 | Habibi | |
| 2010/0017105 A1* | 1/2010 | Pepitone | G08G 5/0008 |
| | | | 701/120 |
| 2011/0242317 A1* | 10/2011 | Wengrovitz | H04N 7/181 |
| | | | 348/143 |
| 2012/0105632 A1* | 5/2012 | Renkis | G08B 13/19619 |
| | | | 348/143 |
| 2015/0120094 A1 | 4/2015 | Kimchi | |
| 2015/0158513 A1 | 6/2015 | Costa | |
| 2015/0277440 A1 | 10/2015 | Kimchi | |
| 2016/0196755 A1 | 7/2016 | Navot | |
| 2016/0257401 A1 | 9/2016 | Buchmueller | |
| 2016/0260264 A1* | 9/2016 | Shih | G07C 5/008 |
| 2017/0110017 A1 | 4/2017 | Kimchi | |
| 2018/0041733 A1* | 2/2018 | Saptharishi | H04N 7/181 |

* cited by examiner

SYSTEMS AND METHODS OF CAPTURING AND DISTRIBUTING IMAGING CONTENT CAPTURED THROUGH UNMANNED AIRCRAFT SYSTEMS

CROSS-REFERENCE TO RELATED APPLICATION

This application claims the benefit of U.S. Provisional Application No. 62/268,313, filed Dec. 16, 2015, which is incorporated herein by reference in its entirety

TECHNICAL FIELD

This invention relates generally to the capture and distribution of imaging content.

BACKGROUND

Building inspections can be time consuming, costly and cause experts to have to travel great distances to perform an inspection. This is true regardless of the level of inspection.

The cost and time incurred to perform an inspection increases based on the distance an inspector has to travel. Still further, the cost can prohibit the use of multiple inspectors.

BRIEF DESCRIPTION OF THE DRAWINGS

Disclosed herein are embodiments of systems, apparatuses and methods pertaining to capturing and distributing imaging content. This description includes drawings, wherein.

Figure 1:
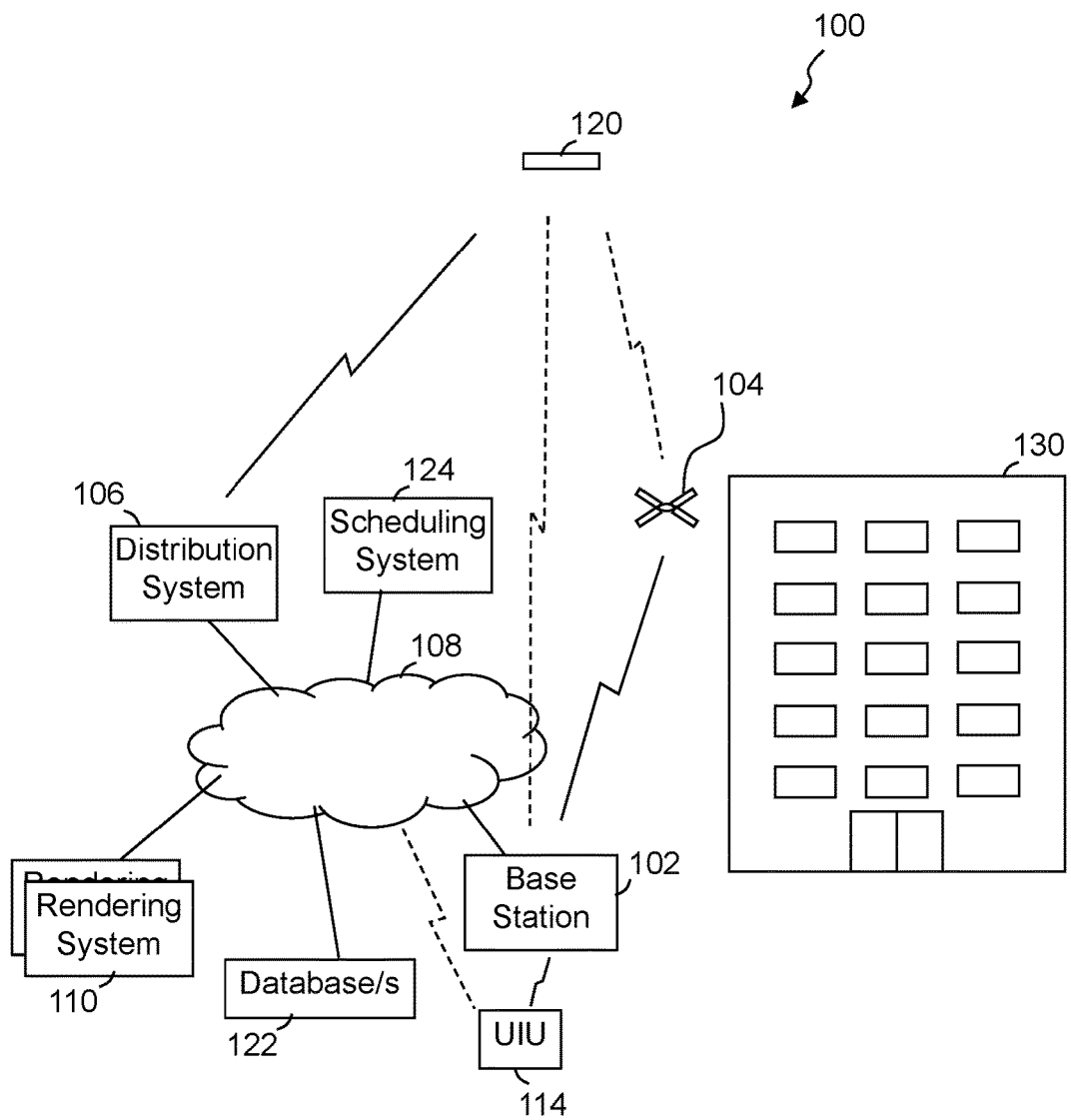
FIG. 1 illustrates a simplified block diagram of an exemplary remote inspection system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Some embodiments provide systems, apparatuses, methods and processes to enable distribution sessions to be accessed by numerous remote users to view in real time imaging content captured by a remote unmanned aircraft system (UAS) while performing one or more tasks. The systems can include an inspection system that allows authorized individuals to inspect a task being performed by a UAS. The remote inspection system, in some applications, can include multiple unmanned aircraft system (UAS) base station control systems that each wirelessly communicates with at least one UAS to provide control signals to the UAS in controlling flight of the UAS. The base station control system (BSCS) typically includes one or more control circuits that communicatively coupled with one or more wired and/or wireless transceivers. A memory is further coupled to the control circuit and stores computer instructions that are executed by the control circuit. The base station control system receives imaging content that is captured by one or more cameras of the UAS. Typically, the imaging content is wirelessly received from the UAS in real time while the UAS is in flight and the one or more cameras are capturing the imaging content. The UAS may process the imaging content prior to wirelessly communicating the content, such as resolution reduction and/or imaging scaling, limit color, and/or other such processing. Such processing typically reduces the bandwidth used in wirelessly communicating the imaging content to the base station control system.

Again, the imaging content is typically received at the base station control system while the UAS is in flight and performing one or more assigned tasks. The base station control system is further configured to establish a network connection over a distributed communication network with a remote networked content distribution system. The content distribution system provides distribution sessions that allow one or more authorized remote users to access each distribution session and view and/or playback content distributed during the distribution session. Accordingly, the base station control system can activate a distribution session through the content distribution system, and communicate over the distributed communication network the imaging content to the content distribution system. The activated distribution system can be accessed by one or more remote authorized rendering systems over the Internet, and allowed to join the distribution session. The remote rendering systems accessing the distribution session can then receive over the Internet in real time the imaging content captured by the one or more cameras of the UAS and distributed by the base station control system, allowing each of the rendering systems to visually play back the imaging content such that a user at each of the rendering systems can watch the imaging content in real time.

FIG. 1 illustrates a simplified block diagram of an exemplary remote inspection system 100, in accordance with some embodiments. The system includes one or more UAS base station control systems 102, one or more UAS 104, and a distribution system 106. In some embodiments, the system may include one or more databases 122 to store imaging content, two-dimensional (2D) and/or three-dimensional (3D) modeling, navigation commands, flight paths, access information, and other such information. Further, the system may include a scheduling system 124 that tracks timing and/or schedules UAS flights, inspections, product deliveries and the like. The UASs are substantially any relevant aircraft that does not have a human pilot aboard that can be remotely controlled and/or can at least partially fly autonomously based on one or more flight paths or plans, parameters, conditions and the like. In some instances a UAS may include one or more propellers, and may be configured to fly all three dimensions (i.e., forward, backward, left, right, up, down, and combinations). Further, some UASs are configured to hover in a relatively fixed position and/or altitude.

The one or more UAS base station control systems 102 that are configured to wirelessly communicate with one or more UAS 104 as the UAS are in flight and preforming one or more tasks. The tasks can include substantially any relevant task that can be performed by the UAS, such as but not limited to delivering one or more products to one or more customers, capturing imaging content of one or more structures 130, tracking movements of an individual or vehicle, identify and/or find the location of a delivery trailer (or vehicle) in a lot of multiple delivery trailers (e.g., using RFID), count a number of delivery trailers and/or vehicles (e.g., using RFID), determine an inventory quantity and/or status of one or more products within a retail store, distribution center or the like, capturing imaging content of a sporting event, performance or the like, and other such tasks. The imaging content captured while the UAS is preforming the task can be accessed by numerous different local or remote users by accessing a distribution session established by one of the one or more distribution systems and/or services. The imaging content can, in some applications, include and/or be accompanied by audio content. Similarly, in some instances, the content captured by the UAS may only include audio content that can be distributed through a distribution session. Each UAS 104 includes one or more cameras and/or other sensors that can capture imaging content at least while the UAS is in flight. The imaging content can be pictures, video, spectral imaging, hyperspectral content, other such imaging content, or a combination of two or more of such content. In some applications, the imaging content can be relatively high resolution content and/or the cameras can be configured to capture imaging content at different resolutions depending on an application, distance from an area or object that is being video recorded, available memory, and/or other such factors. Further, the UAS is configured to wirelessly communicate at least some of the imaging content to the base station control system 102, typically in real time while the UAS is in flight and capturing imaging content.

The base station control system 102 is wired and/or wirelessly communicatively coupled with the distribution system 106 over one or more distributed communication networks 108 (e.g., one or more wired and/or wireless LANs, WANs, Internet, etc.), which may optionally include satellite communication through one or more satellites 120. In some applications the UAS may communicate to the distribution system or other system (e.g., via cellular communication, satellite, etc.). The distribution system 106 is configured to establish multiple different distribution sessions that can each be accessed via the distributed communication network 108 or other such network (e.g., the Internet) by one or more authorized rendering systems 110 each associated with a user. In some applications, the authorization is provided by the user through a log-in, providing a pass code (e.g., a pass code specified on a confirmation of a purchase, on a receipt, communicated the rendering system or user interface system associated with the user, etc.), an identification by the distribution system 106 of the rendering system, a recognition of an IP address, other such authorization, or combination of two or more of such authorizations.

The base station control system 102 is configured to communicate control signals to one or more UAS 104 to be implemented by the respective UAS in performing one or more intended tasks. A local operator at the site where the UAS is to operate typically sets up the UAS, and in some instances may initiate the launch of the UAS. Further, the local operator may take over control over the UAS and/or issue one or more control commands (e.g., navigation commands, camera control commands, etc.). For example, the local operator may be a pilot of the UAS to implement control over the UAS for at least some of the flight and/or when problems occur during the flight. Similarly, the local operator may be a driver of a delivery and/or transport vehicle that transports one or more UASs to a launch location and configures the transport vehicle (e.g., opens one or more compartments, doors, etc.) to allow the UASs to launch from the vehicle, and/or removes one or more UASs from the vehicle allowing the UASs to be launched.

The control signals may include, but are not limited to, navigation commands and/or flight path information, camera activation and/or deactivation signals, sensor reading signals, package delivery and/or drop signals, other such commands, or combination of two or more of such commands. The navigation commands and/or flight paths can be pre-programmed based on the intended task, may be provided in response to an evaluation of current conditions and/or changes in conditions, provided by a local or remote pilot, provided by a remote user at a rendering system 110, or the like. For example, the UAS may be scheduled to deliver a package containing a previously purchased product to a customer at a delivery site associated with the customer (e.g., at a customer's home). A flight path system may determine an intended fight path between a launch point from which the UAS is to take off to the delivery site taking into consideration one or more known obstacles, areas through which the UAS is not allowed to fly, and other such factors. The flight path may further specify altitude, changes in altitude to deliver the package, modifications in the event of one or more anticipated events, and the like. As another example, the flight path may simply specify a delivery site location (e.g., GPS coordinates) and one or more no-fly zones, and the UAS may determine a flight path on its own based on a currently determined location (e.g., GPS data), changes in orientation and altitude, and other such factors. In other embodiments, the flight path may correspond to directing the UAS to capture imaging content of one or more structures (e.g., buildings, warehouses, docks, cranes, trucks, tractors, roadways, runways, ships, or other such structures) to be inspected. The flight path may define specific movements of the UAS around the portions of the structure to be inspected, while in other instances, the flight path may generally direct the UAS to capture images of a structure at a location (e.g., GPS coordinates) or within a geographic area (e.g., array of GPS coordinates), with the UAS detecting the structure through one or more sensors and performing a route along the structure to capture the imaging content of at least portions of the structure to be inspected.

In some embodiments, the base station control system may be communicatively coupled with a separate user interface unit (UIU) 114. The user interface unit may allow a local operator to obtain information from the base station control system, provide control signals to the base station control system, relay imaging content and/or other content through the distributed communication network 108 to the distribution system 106, and the like. The user interface unit may be substantially any relevant device that allows a user to interact with the system 100 including, but not limited to smart phone, tablet, optical head-mounted display systems, smart watch systems, tablet/pad-styled computers, portable computers, and other such consumer electronic user devices. Alternatively or additionally, in some applications, the base station control system 102 may be implemented through a user interface unit. The base station control system may communicate the imaging content to the user interface unit to take advantage of the communication capabilities of the user interface unit. As such, the user interface unit may communicate the imaging content over one or more communication networks 108 to the distribution system 106.

In some embodiments, the UAS base station control system 102 wirelessly communicates with an UAS 104 to provide control signals to the UAS in controlling flight of the UAS. The base station control system receives imaging content that is captured by the one or more cameras of the UAS. In some instances, a camera of the UAS may be configured capture imaging content at a first resolution, but wirelessly communicates imaging content at a lower resolution in order to reduce wireless bandwidth used in wirelessly communicating the imaging content and/or time to communicate the imaging content. As such, the UAS may in some instances process the imaging content while the UAS is in flight and performing an assigned task. The processing can include substantially any relevant processing, such as but not limited to scaling, sizing, modifying coloring, encoding, encrypting, other such processing, or combination of two or more of such processing. For example, the UAS may communicate the imaging content at a second resolution that is a lower resolution than the resolution of the imaging content actually captured while the UAS is in flight and/or capturing imaging content. The higher resolution imaging content may be stored local on the UAS and subsequently communicated to the base station control system 102, to the distribution system 106, other destination or combination of two or more destinations. Often the communication of the higher resolution imaging content may be implemented when the UAS has greater bandwidth, can communicate via wired communication, has a greater amount of time, or the like. For example, the base station control circuit may receive the higher resolution imaging content from the UAS after the UAS has completed capturing the imaging content. The higher resolution imaging content can subsequently be communicated to the networked content distribution system to be accessible through the distribution session, or otherwise communicated to an intended destination.

The base station control system further establish a network connection over the distributed communication network 108 with the remote networked content distribution system 106. The base station control system activates a distribution session through the content distribution system. The distribution session may have been previously scheduled and the base station control system may activate the pending distribution session, the base station control system may initiate and activate a new distribution session, or other such activation. For example, the task to be implemented by the UAS may have been scheduled by a remote scheduling and/or control system based on one or more factors (e.g., a product delivery system may schedule the delivery by the UAS), and the remote scheduling system may further schedule the distribution session. Information regarding the distribution session may further be communicated, via one or more communications, to one or more remote users (e.g., customer, expert, pilot, customer support, etc.) through a respective rendering system, a separate user interface unit, or the like. This information may include a time of the session, authorization information to gain access to the distribution session, other such information, or a combination of two or more of such information.

The base station control system further communicates over the distributed communication network the imaging content received from the UAS to the remote distribution system 106. The distribution system enables multiple remote authorized rendering systems 110 to access the networked content distribution system 106 over the Internet, and to join the distribution session. Once joined, the content distribution system 106 can communicate over and the one or more authorized rendering systems can receive over the Internet the imaging content allowing each of the rendering systems to visually play back the imaging content such that a user at each of the multiple rendering systems can watch the imaging content. Typically, the imaging content is communicated to the base station in real time as the one or more cameras capture the content. The base station control system further communicates in real time the imaging content to the distribution system while the distribution session is active and while the UAS is in flight and capturing the imaging content. As such, in some embodiments, the content distribution system 106 communicates over and the one or more authorized rendering systems receive over the Internet in real time the imaging content allowing each of the rendering systems to visually play back the imaging content such that a user at each of the multiple rendering systems can watch the imaging content in real time.

In some embodiments, the content distribution system 106 can comprise multiple servers and memory distributed over the communication network 108 and each can be configured to receive imaging content from tens to thousands of base station control systems. As such, the content distribution system can simultaneously establish thousand to tens of thousands, or even hundreds of thousands of distribution sessions. Each distribution session can be associated with a single UAS that is performing a task, while in some implementations multiple UAS may be cooperatively performing a task and the imaging content of the multiple UAS can be associated with a single distribution session. The UAS and/or the base station control system may signal when to terminate a distribution session, and/or a user through a rendering system may issue one or more commands to terminate the distribution session and/or the task being performed. In some embodiments, hundreds, to hundreds of thousands of base station control systems are each in wireless communication with at least one separate corresponding UAS. Each of the base station control systems are configured to establish a network connection over the distributed communication network with the remote networked content distribution system, and activate separate distribution sessions through the content distribution system that are separately accessible with different authorizations by authorized rendering systems 110. The base station control systems communicate over the distributed communication network the corresponding additional imaging content, captured by a corresponding UAS, to the remote networked content distribution system 106 that enables hundreds of sets of one or more remote authorized additional rendering systems to access one of the additional imaging content that the rendering system has been authorized to access over the Internet.

The remote rendering systems can each join one of the corresponding distribution sessions. Each remote rendering system that has joined a distribution session receives over the Internet in real time the authorized one of the additional imaging content allowing each of the additional rendering systems to visually play back the authorized one or more imaging content associated with the distribution session. Users at each of the rendering systems can then watch the corresponding additional imaging content in real time. Typically, the imaging content is distributed substantially simultaneously to each of the rendering systems in real time. In some embodiments, the distribution system 106 establishes an on-line meeting and/or conferencing service and/or activates an on-line meeting service (e.g., WebEx, provided through Cisco Systems, Inc., GoToMeeting, provided through Citrix Systems, Inc., or other such meeting on-line service). The imaging content may similarly be uploaded to one or more distribution systems that allow access to the imaging content (e.g., YouTube, Pixorial, and other such video streaming services). The imaging content can be communicated to the one or more remote rendering systems through an activated online meeting service and enables access by the remote rendering systems to the imaging content through the online meeting service.

As described above, the imaging content is captured by one or more cameras of the UAS while preforming one or more tasks. The tasks can be substantially any relevant task. For example, the task can include delivering a package with a purchased product to a customer. The one or more cameras of the UAS can capture imaging content while and/or after the package is delivered to a delivery location. In some instances, the imaging content includes imaging content captured by the UAS while the UAS is in a process of delivering a previously purchased product to a customer. The customer can utilize a rendering system associated with the customer and provide an authorization and/or the rendering system can provide an authorization to the distribution system (or third party authentication service). The authorized rendering system can access and/or log into a distribution session with the imaging content being communicated to the rendering system enabling the customer to view the imaging content of the delivery of the product in real time through the customer's corresponding rendering system.

As a further example, the UAS may be flying from a launch system and/or launch vehicle with one or more cameras activated once the UAS is within a threshold distance of the delivery location. The imaging content is communicated from the UAS to the base station control system that communicates the imaging content to the distribution system. The distribution system identifies the base station communicating the imaging content and identifies and associated distribution session. In some instances, a scheduling system may activate the distribution session and be provided with one or more access authorization information (e.g., password, distribution session identifier, and/or other such information. This information can be provided to the base station control system and communicated by the base station control system when accessing and/or starting the distribution session. The distribution system can use the identifier information to associate the incoming imaging content, which may be stored at the distribution system and/or one or more databases 122. The one or more remote rendering systems may similarly be provided with one or more distribution session identifiers and/or authorization information (e.g., provided as part of a confirmation of delivery with an invitation to the customer to view at least part of the delivery through the distribution session). The distribution system can identify the distribution session the rendering system is attempting to access, authenticate the rendering system and/or user, and initiate the distribution of the imaging content to the rendering system. In some applications, the base station control system may alternatively activate the distribution session, and the distribution system can provide the base station control system with the relevant distribution session identifier information and/or authorization information. The base station control system and/or the distribution system may further provide the distribution session identifier information and/or authorization information to a scheduling system and/or customer interface system that can then provide that information to a customer to allow access to the relevant distribution session.

In some implementations, the task performed by the UAS may be associated with a remote expert inspector preforming an inspection of a structure 130, such as but not limited to buildings, warehouses, equipment, storage facility, manufacturing plant, retail store, shopping mall, office building, houses, apartment complex, power plant, other such buildings, dam, levee, canal, storage tank, dock, road, highway, runway, tracks, ships, or other such structures other such infrastructure, crane, train, truck, tractors, scaffolding, other such equipment, other such structures, or combination of two or more of such structures and the like. One or more UAS can be launched to fly about a structure being inspected to capture the imaging content (e.g., pictures, video, spectral imaging, and/or other such imaging content). The UAS may be configured to autonomously operate in accordance with a predefined flight plan, be controlled by a user through the base station control system (and/or a UAS control system, application on a user interface unit in wireless communication with the UAS, etc.) that is in wireless communication with one or more UAS, receiver control instructions and/or commands from a remote operator at a remote rendering system, and/or be controlled through a combination of two or more of such control inputs.

The imaging content captured by the one or more cameras of the UAS can be communicated by the base station control system and/or otherwise communicated to the distribution system 106. A remote rendering system 110 associated with an inspector (typically an expert with expertise in inspecting the structure being inspected) can access through the rendering system a corresponding distribution session enabled through the distribution system to render the imaging content and allow the remote inspector to inspect the structure. The imaging content can include pictures, video, sensor data, and/or other such information corresponding to the structure 130 being inspected as the UAS 104 flies about an exterior and/or an interior of the structure.

The imaging content is communicated over one or more distributed communication and/or computer networks to the distribution system that enables remote rendering system to access and/or participate in a distribution session over the distributed communication network. The rendering system receives and renders or otherwise plays back the imaging content allowing an inspector, at a location that is remote from the location of the structure. The displayed imaging content allows the inspector to visually inspect at least portions of the structure while being remote from the structure. In many instances, the imaging content is communicated to the remote rendering system in real time while the UAS is in flight and capturing the imaging content. Further, in some applications, the base station control system can communicate to the UAS, while the UAS is flying about the structure, one or more navigation commands and/or instructions, imaging control commands, and/or other such commands that are to be implemented by the UAS while in flight. In some instances, for example, one or more navigation commands can be communicated to the UAS while in flight causing the UAS to fly in accordance with at least the navigation command.

Inspecting structures in an area that is remote from an inspection expert can be expensive and time consuming. For example, inspecting a structure that is located in another country (e.g., the overseas in a developing country) typically includes sending an inspector to the location of the structure so that the inspector can assess in person the condition of the building, equipment, etc. It consumes time, money and talent resources. Further, if the building is multi-story the inspector may need to implement complex (and possibly hazardous) methods to visually inspect cracks or other structural compromises. Similarly, if there is damage to the structure, the inspector may be put at risk in trying to fully inspect the structure. The remote inspection system, however, allows for an inspection to be performed when the inspector is not at location of the structure to be inspected.

Further, the distribution of the imaging content in real time allows the inspector to request additional imaging content of one or more portions of the structures. For example, the inspector may detect one or more questionable areas of the structure. One or more requests and/or commands can be communicated from the rendering system to the UAS to cause the UAS to obtain additional imaging content of the one or more questionable areas of the structures. In some instances, the inspector can issue remote navigation instructions. The base station control system can receive one or more remote navigation instructions from the inspector through a rendering and/or inspection system 100 associated with the remote inspector. The base station control system can implement one or more instructions based on the communication from the inspector and/or communicate to the UAS while the UAS is flying about the structure one or more navigation commands corresponding to the navigation instruction.

In some instances, the navigation commands, when implemented by the UAS, cause the UAS to deviate from an intended flight path in accordance with at least the navigation command. For example, the base station control system can cause a communication of one or more navigation commands that cause the UAS to deviate from a preprogrammed flight path, and to capture additional imaging content while deviating from the preprogrammed flight path. In other instances, the navigation instructions may interrupt a preprogrammed fight path, implemented, and when complete the UAS may return to the preprogrammed fight path at the point of interruption. In yet other instances, the UAS may not be implementing preprogrammed flight plans, and instead implements commands issued by the remote inspector and/or a local controller submitting navigation instructions through a user interface of the base station control system and/or a user interface unit 114 communicatively coupled with the base station control system and/or accessing the distribution session.

Again, the preprogrammed flight path may be provided to the UAS as determined by the base station control system, the inspector, and/or a remote navigation control system, and/or determined at least in part by the UAS (e.g., based on image processing of one or more images of the structure). The UAS may autonomously implement a preprogrammed flight path, while in other instances, the base station controller, a local user and/or a remote user may issue one or more navigation instructions. For example, a preprogrammed flight path may cause the UAS to travel along a length of a structure at a first height, which may be a height dependent on a distance the UAS is from the structure and/or field of view of one or more cameras of the UAS. Upon flying the length of the structure of a side being captures, the UAS can be pre-programmed to move vertical by approximately a vertical dimension of a field of view of a camera of the UAS, and fly back along the length (e.g., to its starting point), where the UAS again may move vertically (depending on a size of the structure, the distance from the structure, the field of view of the camera, etc.). The serpentine pattern can be repeated any number of times to capture one or more images and/or video of at least a portion of interest of the structure or to fully survey the vertical expanse of that side of the structure. After capturing imaging content of a first side of the structure, the pre-programmed flight path can cause the UAS to continue similar patterns to capture imaging content of one or more other areas of interest of the structure and/or the rest of the structure, whether interior and/or exterior. Similar steps can be performed to capture imaging content of the ceiling, roof, floor, posts, pillars, and/or other such portions of a structure.

Further, in some applications, the UAS may capture a first image that is at a first distance from the structure, and typically at a relatively large distance to capture an image and/or video that includes most if not all of the structure. A basic shape of that side of the structure can be determined and then using distance sensor and the determined basic shape, the UAS can implement preprogrammed path that is determined based on the determined basic shape. The distance sensor data can be used to detect variations in the side, roof, floor, etc. of the structure and to make appropriate adjustments in flight path.

The navigation instructions and/or commands issued by the inspector, customer, pilot or other person accessing the distribution session through a remote rendering system may cause the UAS to deviate from the preprogrammed flight path. In other instances, however, the navigation instructions and/or commands can be implemented after completing a predefined portion of the preprogrammed flight path or completed the entire preprogrammed flight path. For example, an inspector may, based on visually viewing the imaging content, detect an area of the structure that the inspector would like more details about, such as imaging content taken at a closer distance to a certain area. As such, a user interface may be provided through the rendering system that allows the inspector to submit one or more navigation instructions, to specify portions of an area of the structure, and/or issue other such navigation instructions. The navigation instructions can be communicated from the rendering system to the distribution system that can forward the navigation instructions to the base station control system 102. Based on the navigation instructions, the control system can issue one or more navigation commands to the UAS, such as implement a zoom of a camera, move closer to the structure, preform movements of a subsequent predefined pattern at a closer distance and alone a specified area, other such commands, or combination of two or more of such commands.

Some embodiments further provide additional sensor data to inspector. IN some applications, the UAS may include one or more additional sensors. This sensor data captured by the one or more sensors can be communicated to the base station control system to be communicated over the distributed communication network to the content distribution system. Again, the communication typically identified the base station control system, the UAS, the distribution session, other such identifier or combination of two or more such identifiers to allow the distribution system to determine which of multiple distribution sessions the sensor data is to be associated. The remote rendering system 110 associated with the inspector is provided access through the distribution session to the additional sensor data, and rendered and/or otherwise displayed through the rendering system to be considered by the inspector as part of the inspection of the at least the portion of the structure. In some implementations, the UAS may include, for example, one or more hyperspectral sensors to detect information, such as but not limited to temperature variations. The base station control circuit receives the hyperspectral sensor data detected by a hyperspectral sensor on the UAS, and communicates the hyperspectral sensor data to the networked content distribution system. The inspector can inspect this information through the rendering system authorized to access the corresponding distribution session. Other sensor data, such as but not limited to distance, height, width, depth, variations in depth, wind speed, temperature, other such sensor data, or a combination of two or more of such sensor data can be obtained from the UAS as it moves about the structure providing the inspector with further information to be considered in the inspection of the structure.

Figure 2:
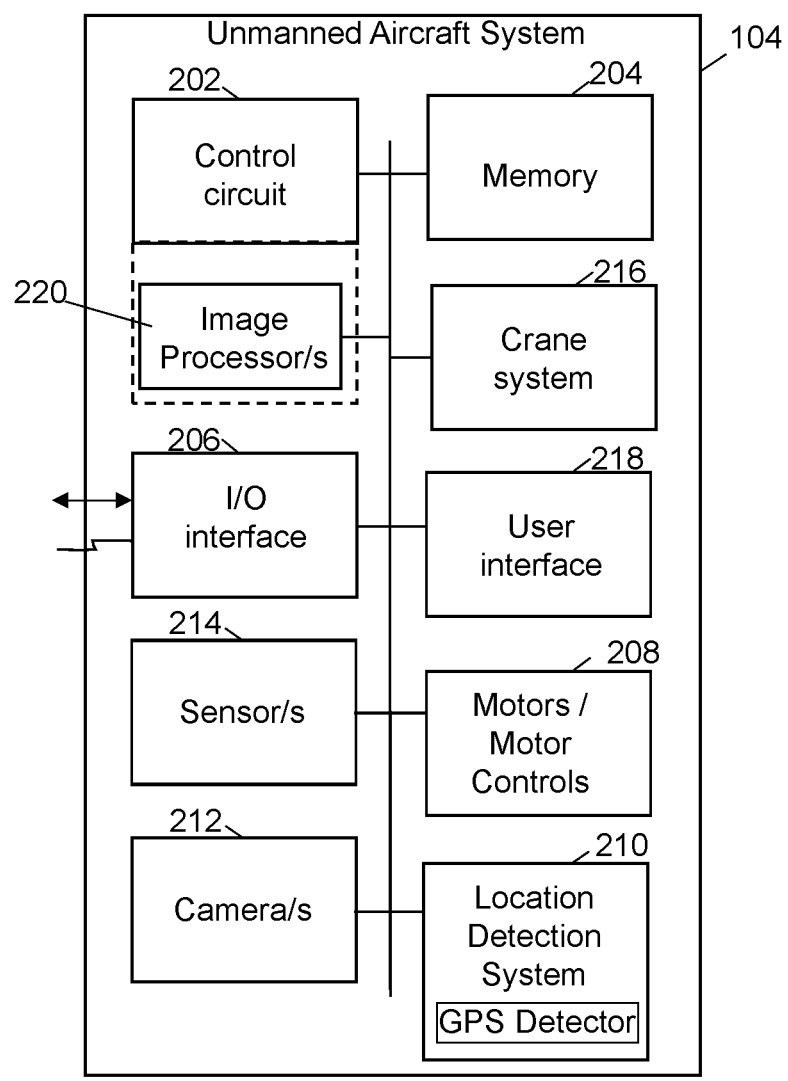
FIG. 2 illustrates a simplified block diagram of an exemplary UAS, in accordance with some embodiments.

FIG. 2 illustrates a simplified block diagram of an exemplary UAS 104, in accordance with some embodiments. The UAS includes one or more control circuits 202, memory 204, input/output (I/O) interfaces and/or devices 206, motors and motor control circuitry 208, location detection systems 210, and one or more cameras 212. Some embodiments further include one or more sensors 214, a crane system 216, a user interface 218, and/or other such systems.

The control circuit 202 typically comprises one or more processors and/or microprocessors that couple with the memory 204, which stores operational codes or sets of instructions that are executed by the control circuit 202 and/or processor to implement the functionality of the UAS 104. For example, in some applications, the control circuit may include and/or couple with one or more image processors 220 that provide image processing of at least imaging content, which may include image scaling, video scaling and/or other processing of images and/or video captured by one or more cameras 212 of the UAS 104. In some embodiments, the memory 204 may also store some or all of particular data that may be needed to at least navigate between at least one or more launch locations and the locations where a task is to be performed.

It is understood that the control circuit 202 may be implemented as one or more processor devices as are well known in the art. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the UAS 104; however, the memory 204 can be internal, external and wirelessly accessible, or a combination of internal and external memory. Additionally, the UAS typically includes one or more power supplies (not shown) that is typically rechargeable, and/or it may receive power from an external source. While FIG. 2 illustrates the various components being coupled together via a bus, it is understood that the various components may actually be coupled to the control circuit 202 and/or one or more other components directly.

Generally, the control circuit 202 and/or electronic components of the UAS 104 can comprise fixed-purpose hardwired platforms or can comprise a partially or wholly programmable platform. These architectural options are well known and understood in the art and require no further description here. The UAS and/or control circuit can be configured (for example, by using corresponding programming as will be well understood by those skilled in the art) to carry out one or more of the steps, actions, and/or functions described herein. In some implementations, the control circuit 202 and the memory 204 may be integrated together, such as in a microcontroller, application specification integrated circuit, field programmable gate array or other such device, or may be separate devices coupled together.

The I/O interface 206 allows wired and/or wireless communication coupling of the UAS 104 to external components, such as the base station control system 102, distribution system 106, rendering system 110, user interface unit 114 (e.g., smart phone, tablet, optical head-mounted display systems, smart watch systems, and other such consumer electronic user devices), in some instances one or more other UAS, and other such devices or systems. Typically, the I/O interface 206 provides at least wireless communication (e.g., cellular, Wi-Fi, LTE, Bluetooth, RF, and/or other such wireless communication), and in some instances may include any known wired and/or wireless interfacing device, circuit and/or connecting device, such as but not limited to one or more transmitter, receiver, transceiver, etc.

The location detection system 210 obtains location information to determine a current location of and track the location and movements of the UAS. The control circuit 202 utilizes the location information in controlling the movements of the UAS. In some instances, the location detection system may include a global positioning detection system and/or system that received global positioning coordinate information, Wi-Fi signal triangulation and/or evaluation system, cellular tower triangulation system, and/or other such location detection system. In some embodiments, the location detection system 210 includes and/or couples with one or more global positioning satellite (GPS) systems, and/or other such location information acquisition systems. Further, the location detection system may use information provided by one or more sensors 214 in determining and/or tracking location information. The sensors can include substantially any relevant sensor such as, but not limited to, one or more inertial sensors, accelerometers, altimeters, gyroscopes, compass, distance measurement systems (e.g., ultrasound, laser, etc.), and/or other such sensor information. Other sensors 214 may be included that may or may not be used for location detection, such as but not limited to distance measurement sensors, hyperspectral sensors, light sensors, wireless signal strength sensor, weather sensors, and the like.

The UASs 104 further include one or more cameras 212 that capture images and/or video that can be stored in the memory 204, communicated via the I/O interface 206, processed by the control circuit 202 and/or image processor 220, and the like. In operation, the control circuit 202 of the UAS can activate one or more of the cameras 212, and in some implementations activates a cameras based on a preprogrammed flight plan, instructions from the base station control system, based on a detected distance from a structure, or the like. Some embodiments include different cameras directed in different general directions (e.g., up, down, forward, backwards), additionally or alternatively, one or more cameras may be cooperated with camera directional control systems (e.g., motors, tracks, gimbals, etc.) that can control the movement of one or more cameras. Further, different cameras with different resolution capabilities may be included to capture imaging content at different resolutions. In some embodiments, one or more pictures and/or video captured by the camera/s 212 of the UAS can be evaluated for one or more parameters, rules and/or conditions.

In some implementations, a UAS 104 may include a crane system 216 that allows a product being delivered at a delivery location to be lowered to the delivery site while the UAS hovers, typically at least at a threshold height, over a the delivery site. As such, the UASs 104 in at least some embodiments have the ability to autonomously deliver one or more packages, products and/or cargo to an intended delivery location without having to physically land the UAS. In some implementations, the UAS can be controlled to maintain a stable hover above an intended delivery location. Maintaining the aircraft at an elevation can make the delivery safer to both humans, animals, property, and the like, for example because they would not encounter the spinning propellers of the UAS. The UAS, while hovering, can lower the package through a crane system 216. The crane system can include, for example, a crane motor that cooperates with a rotational drive shaft that is rotated by the crane motor, with one or more reels, spools or the like selectively cooperated with the drive shaft. Each crane system typically includes at least one cord, cable, rope, or the like that is unspooled and retracted through the rotation of a corresponding spool. The cord can be spooled out by the crane system to lower the package to the delivery site while the UAS 104 hovers over the delivery site. The control circuit 202 and/or a control circuit of the crane system can control the decent of the package by controlling a rate at which the UAS drops in elevation and/or controls the rate of spooling by the crane system in lowering the package. In some applications the crane system further includes and/or cooperates with a package release system. In some embodiments, the control circuit 202 triggers the release of a package, while in other implementations the package release system is a mechanical release without need of communication to trigger the release.

In some implementations, the UAS may include one or more user interfaces 218 that can be used for user input and/or output display. For example, the user interface 218 may include any known input devices, such one or more buttons, knobs, selectors, switches, keys, touch input surfaces, audio input, and/or displays, etc. Additionally, the user interface 218 includes one or more output display devices, such as lights, visual indicators, display screens, etc. to convey information to a user. Similarly, the user interface 218 in some embodiments may include audio systems that can receive audio commands or requests verbally issued by a worker, and/or output audio content, alerts and the like.

Figure 3:
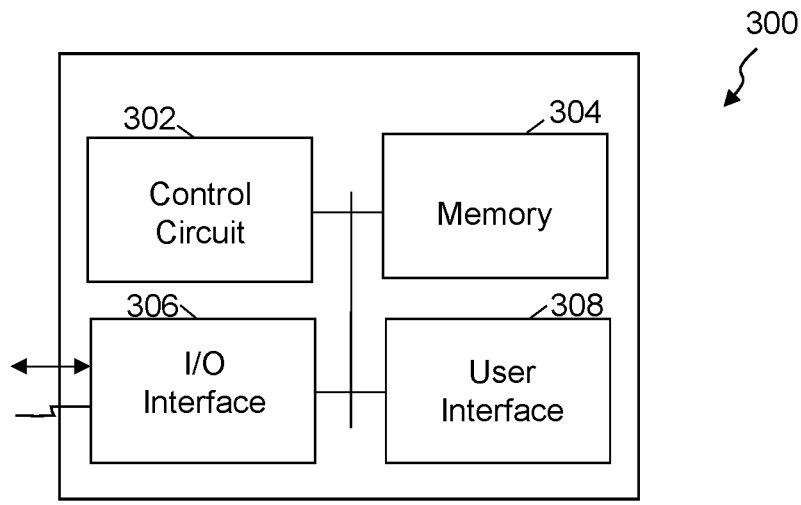
FIG. 3 illustrates an exemplary system for use in implementing systems, apparatuses, devices, methods, techniques and the like in capturing and distributing imaging content in accordance with some embodiments.

Further, the methods, techniques, systems, devices, services, servers, sources and the like described herein may be utilized, implemented and/or run on many different types of devices and/or systems. Referring to FIG. 3, there is illustrated an exemplary system 300 that may be used for any such implementations, in accordance with some embodiments. One or more components of the system 300 may be used to implement any system, apparatus or device mentioned above or below, or parts of such systems, apparatuses or devices, such as for example any of the above or below mentioned base station control system 102, distribution system 106, scheduling system 124, rendering system 110, user interface unit 114, and the like. However, the use of the system 300 or any portion thereof is certainly not required.

By way of example, the system 300 may include one or more system control circuits 302, memory 304, and input/output (I/O) interfaces and/or devices 306. Some embodiments further include one or more user interfaces 308. The system control circuit 302 typically comprises one or more processors and/or microprocessors. The memory 304 stores the operational code or set of instructions that is executed by the system control circuit 302 and/or processor to implement the functionality of the base station control system 102, distribution system 106, scheduling system 124, rendering system 110, user interface unit 114, and the like. In some embodiments, the memory 304 may also store some or all of particular data that may be needed to establish distribution sessions, distribute imaging content, enable remote access to distribution sessions, enable navigation instructions and/or control instructions to be communicated from a rendering system and be forwarded to the UAS, and make any of the detections, associations, determinations, measurements and/or communications described herein. Such data may be pre-stored in the memory, received from an external source, be determined, and/or communicated to the system.

It is understood that the system control circuit 302 and/or processor may be implemented as one or more processor devices as are well known in the art. Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 304 is shown as internal to the system 300; however, the memory 304 can be internal, external or a combination of internal and external memory. Additionally, the system typically includes a power supply (not shown), which may be rechargeable, and/or it may receive power from an external source. While FIG. 3 illustrates the various components being coupled together via a bus, it is understood that the various components may actually be coupled to the system control circuit 302 and/or one or more other components directly.

Generally, the system control circuit 302 and/or electronic components of the system 300 can comprise fixed-purpose hard-wired platforms or can comprise a partially or wholly programmable platform. These architectural options are well known and understood in the art and require no further description here. The system and/or system control circuit 302 can be configured (for example, by using corresponding programming as will be well understood by those skilled in the art) to carry out one or more of the steps, actions, and/or functions described herein. In some implementations, the system control circuit 302 and the memory 304 may be integrated together, such as in a microcontroller, application specification integrated circuit, field programmable gate array or other such device, or may be separate devices coupled together.

The I/O interface 306 allows wired and/or wireless communication coupling of the system 300 to external components and/or or systems. Typically, the I/O interface 306 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 308 may be used for user input and/or output display. For example, the user interface 308 may include any known input devices, such one or more buttons, knobs, selectors, switches, keys, touch input surfaces, audio input, and/or displays, etc. Additionally, the user interface 308 include one or more output display devices, such as lights, visual indicators, display screens, etc. to render imaging content, convey information to a user, such as but not limited to status information, a graphical user interface, notifications, errors, conditions, and/or other such information. Similarly, the user interface 308 in some embodiments may include audio systems that can receive audio commands or requests verbally issued by a user, and/or output audio content, alerts and the like.

Figure 4:
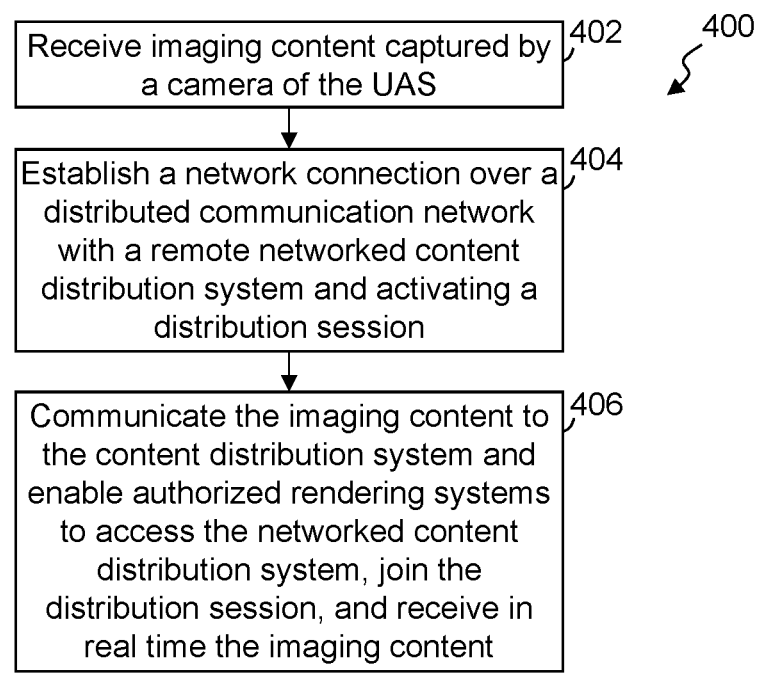
FIG. 4 illustrates a simplified flow diagram of an exemplary process of capturing and distributing imaging content captured by an UAS, in accordance with some embodiments.

FIG. 4 illustrates a simplified flow diagram of an exemplary process 400 of capturing and distributing imaging content captured by an UAS 104, in accordance with some embodiments. In step 402, imaging content from an UAS is received through a wireless transceiver of a base station control system. The imaging content is captured by one or more cameras of the UAS, and in some applications at least partially processed by the UAS while the UAS is in flight and performing an assigned task.

In step 404, a network connection is established over a distributed communication network 108 with a remote networked content distribution system 106, and a distribution session is activated through the content distribution system. In step 406, the imaging content is communicated over the distributed communication network to the remote networked content distribution system. Multiple remote authorized rendering systems 110 are enabled to access the networked content distribution system over the Internet, to join the distribution session, and to receive over the Internet in real time the imaging content allowing each of the rendering systems to visually play back the imaging content such that a user at each of the multiple rendering systems can watch the imaging content in real time. Some embodiments establish, through each of hundreds of additional base station control systems 102, each in wireless communication with a separate corresponding UAS, a network connection over the distributed communication network 108 with the content distribution system 106. Separate distribution sessions are activated through the content distribution system that are separately accessible with different authorizations by authorized rendering systems. Additional imaging content captured by each of the corresponding UASs is communicated over the distributed communication network to the remote networked content distribution system which enables hundreds of sets of one or more remote authorized additional rendering systems 110 to access one of the additional imaging content that the rendering system has been authorized to access over the Internet, join the corresponding distribution session, and receive over the Internet in real time the authorized one of the additional imaging content allowing each of the additional rendering systems to visually play back the authorized one of the imaging content and a user at each of the multiple rendering systems to watch the corresponding additional imaging content in real time.

In some embodiments the imaging content is captured during a delivery of a product. The communication of the imaging content can include communicating the imaging content captured by the UAS while the UAS is in a process of delivering a previously purchased product to a customer. A first rendering system 110 associated with the customer can be authorized to access the distribution session enabling the customer to view the imaging content of the delivery of the product in real time through the first rendering system.

Some embodiments allow the imaging content to be used to inspect a structure (e.g., building, warehouse, dock, train tracks, road, tracker, crane, etc.). The activation of the distribution session can enable access by a remote rendering system 110 associated with a remote inspection expert to the imaging content that includes imaging content of a structure being inspected by the remote expert as the UAS 104 flies about the structure capturing the imaging content. The remote inspector can then view the imaging content on the rendering system through the distribution session enabling remote inspection of the structure in real time. IN some applications the inspector may be able to issue navigation instructions. One or more remote navigation instructions can be received from the remote rendering system 110 associated with the remote inspector. One or more navigation commands corresponding to the navigation instructions can be communicated to the UAS while the UAS is flying about the structure to cause the UAS to deviate from an intended flight path in accordance with at least the navigation command. In some instances, the base station control system can communicate the navigation command that causes the UAS to deviate from a preprogrammed flight path and to capture additional imaging content while deviating from the preprogrammed flight path.

In some embodiments the base station control system 102 receives, from the UAS 104, additional sensor data captured by one or more sensors 214 of the UAS. The additional sensor data can be communicated over the distributed communication network to the content distribution system 106 to be distributed as part of the distribution session. When accessing the distribution session, the remote rendering system 110 associated with the inspector can be caused to provide the inspector with access to the additional sensor data as part of the inspection of the at least the portion of the structure. For example, in receiving the additional sensor data, some embodiments receive hyperspectral sensor data detected by one or more hyperspectral sensors on the UAS. The hyperspectral sensor data can be communicated to the networked content distribution system to be accessible through the distribution session. In providing imaging content to allow inspection of the structure, some embodiments provide imaging content of an interior and/or an exterior of the structure being inspected. For example, the imaging content received can include imaging content of an interior of the structure, the exterior of the structure, a combination of at least a portion of an interior of the structure and at least a portion of an exterior of the structure. In some applications, the inspector at an associated rendering system can access, setup and/or initiate a distribution session through the distribution system. Further, the inspector may communicate to the base station control system 102 and/or an operator at the base station control station (e.g., a pilot of the UAS) to command and/or control the capturing of the imaging content. The imaging content is then provided through the distribution session allowing the inspector to watches the imaging content (e.g., video feed) and provide an inspection of the structure without having to be at the location of the structure.

The base station control system may additionally receive the imaging content in a higher resolution from the UAS after the UAS has completed capturing the imaging content. The higher resolution imaging content is consistent with the imaging content provided while the UAS is in flight but with a higher resolution, which was captured and stored on the UAS while in flight. In some applications, the UAS captures the higher resolution imaging content and processes the higher resolution imaging content to provide the imaging content at a lower resolution, which when wirelessly communicated reduced a bandwidth use and/or reduces transmission times. The higher resolution imaging content can subsequently be provided to a remote rendering system, typically upon request by a user at the rendering system. For example, an inspector may want to view some or all of the higher resolution imaging content, such as to confirm a determination, reevaluate a portion of the structure, and the like.

The UAS may be configured to autonomously implement a flight path or at least a portion of the flight path communicated to the UAS. For example, a UAS may autonomously implementing a preprogrammed flight path that causes the UAS to travel along a length of the structure at a first elevation, change to a second elevation based on a field of view of the camera, and travel along the length of the structure while at the second elevation.

Accordingly, some embodiments allow for remote visual inspection of a structure (e.g., building, equipment, etc.) by a structural expert from substantially anywhere in the world. A UAS can fly around the interior and/or exterior of a structure providing real time imaging content (e.g., images, video feed, etc.) from one or more cameras of the UAS. One or more cameras of the UAS may additionally or simultaneously record high quality video and/or still images. The UAS can be launched, operated and recovered by someone proximal to the structure under inspection (e.g., within 1 km). The imaging content is communicated to the distribution system that allows a user to remotely access the imaging content through a rendering system 110. The rendering system may be a smartphone, tablet, portable computer, or other such rendering system. In some embodiments, the distribution system enables the activation of a distribution session and authorized rendering systems can participate in the distribution session and/or receive a video feed The UAS may be operated in either a preprogrammed flight path where it follows a pattern (e.g. a grid, serpentine, spiral, etc.) to capture imaging content of at least those portions of the structure to be inspected, and in some instances the entirety of the structure being inspected. Additionally or alternatively, a local or remote pilot may directed manually direct the UAS. Similarly, the user at the remote rendering system 110 be allowed to communicate one or more instructions (e.g., navigation instructions, camera control instructions, etc.) that can be implemented by the UAS allowing the remote user some control over at least the imaging content captured by the UAS. For example, the pilot, remote user or other such individual may issue one or more commands to cause the UAS to loiter at a certain area near the structure and/or approach a certain area of the structure more closely to obtain more imagery and/or imaging content at different angles to allow the remote user to evaluate the imaging content (e.g., allow a structural expert to make a decision about the integrity of the structure). In some instances, the remote user and/or a local operator can activate one or more options, while the UAS is performing a preprogrammed flight, that are each associated with one or more locations of the UAS at least relative to the structure during the preprogrammed flight. The options can further cause the UAS to return to an area of the structure being image captured after the preprogrammed fight to implement a more detailed preprogrammed flight (may be based on type of analysis being performed—e.g., zoom in, slower pan, other sensors, etc.), and/or allow the remote user, pilot, local operator to implement further imaging capturing relative to the designated areas corresponding to the selected options.

In some implementations, the UAS may be equipped with hyperspectral sensors (e.g., infrared) that can capture additional data for non-structural analysis (e.g., to perform an energy audit by looking for leaking cool/hot air, cold/hot spots on HVAC units, etc.). The imaging content can be communicated from the UAS while in flight, and/or communicated after the completion of the flight. In some embodiments, high quality still and video imagery can be downloaded from the UAS after the flight and uploaded to the distribution system for further consideration by the remote user (e.g., further analysis by the structural expert). Connectivity to the distribution system and/or service may, in some instance, will be over the Internet, such as through one or more Wi-Fi networks, high speed cellular network (e.g., LTE), satellite 120 (e.g., BGAN), other such communication methods, or combination of two or more of such communication methods.

Similarly, the imaging content can be provided to other users. For example, customers can be provided with authorization to access a distribution session to view imaging content of a product ordered by the customer that is being delivered by the UAS. The customer may view the imaging content in real time as the product is being delivered, or view recorded imaging content to confirm delivery (e.g., after receiving a notification of delivery). Similarly, an inspector can subsequently view recorded imaging content.

As such, some embodiments allow for the remote inspection of structures (including third party suppliers) for structural integrity. For example, suppliers may be located in overseas. Typically, the inspector has to assess the condition of the structure in person. Sending an inspector to the location consumes time, money, and talent resources. If a potential structural deficiency is reported, typically an expert has to board a plane and travel to the structure location. If the structure is a multi-story building, the expert may need to perform complex (and possibly hazardous) visual inspection (e.g., cracks or other structural compromises). The UAS may further be used to collect hyperspectral data about the structure. For instance infrared imagery of a structure would allow for the collection of data to perform an energy audit of a building, mobile equipment, etc. Other sensors may be included on the UAS, such as but not limited to laser sensors (e.g., LIDAR) that could be used to construct a precise (e.g., on the order of centimeters) 3D model of a portion of or the entire structure. This data could be put to myriad uses, such as estimating the snow load on a building's roof, looking for external infrastructure (e.g., pipes, HVAC units, etc.) which have shifted after an earthquake and may be in need of servicing, and other such inspections.

The distribution and/or broadcast of the imaging content can be through the Internet, cellular communication, radio frequency, other such communication methods, or combination of two or more of such methods. In some instances, the UAS and/or the base station control system may conned with a hotspot, which may be implemented by the UAS, base station control system, a user interface unit. The communication method typically enables the communication of the imaging content to the distribution system. In other instances, however, the communication of the imaging content may be direct (e.g., cellular communication directly to a rendering system).

In some applications, a local operator activates the UAS, while in other instances the UAS is automatically initiated (e.g., based on a schedule). The activation can cause the base station control system and/or the distribution system to contact people of interest (e.g., people associated with a delivery, one or more inspectors, managers, evaluator, and the like). The imaging content and/or other data (e.g., sensor data) can be captured through the UAS systems and communicated to the distribution system. The UAS may record the imaging content and/or other data. Additionally or alternatively, the base station control system and/or distribution system may record the imaging content, other data, communications and/or commands from a remote user and/or the operator, other such information, or a combination of two or more of such information.

As described above, in some embodiments, one or more UASs can be used for real-time structure inspection. The structure to undergo visual structural inspection is identified and determined to be more than a threshold distance from a structural expert. A UAS operator is directed to take one or more UASs to the structure. In some applications the UAS remain proximal (e.g., less than 1 km) to operator, but may be operated beyond line of sight (e.g., the operator likely will have a video feed and telemetry data from the UAS. The base station control system 102 and/or user interface unit 114 can communicate the imaging content to the distribution system that allows the remote structural expert to view the imaging content in real-time. For example, the distribution system may use Internet Protocol (IP) based connectivity, Wi-Fi, Ethernet, cellular (e.g., HSDPA, LTE, etc.), satellite 120 (e.g., BGAN, VSAT, etc.), or other such communication methods or combination of two or more of such communication methods.

The UAS may be directed manually by the operator and/or remote user at a remote rendering system 110 as it performs the assigned task (e.g., delivery a package, survey a structure, etc.). Additionally or alternatively, the UAS may be programmed to fly a pattern autonomously. For example, with regard to inspecting a simple box shaped building: the UAS can be programmed to fly the length of the starting side of the building at a height dependent on a distance from the building and one or more cameras field of view; once the UAS flies the length of that side it can ascend by roughly the size of the camera's field of view and fly back to its starting point where it will ascend again and repeat this racetrack pattern until it has fully survey the vertical expanse of that side; after capturing imaging content and/or other sensor data on one side of the building, the UAS will then make a 90 degree turn and repeat the above steps surveying the next side of the structure; these steps can be repeated until the UAS has completely captures the sides of the structure at which point the UAS may ascend and fly a race track pattern over the roof of the structure maintaining a height above the roof controlled by sensors and/or the operator. The structural expert can observe in real time the imaging content via the distribution system 106 and/or service. Should the inspector see something they want additional data on, she/he can issue commands and the UAS and/or the operator can implement the instruction (e.g., zoom in, pause the survey and collect more data around a specific point, fly closer to the structure, fly away from the structure, approach from a different angle, etc.). In some applications the UAS and/or base station control system may apply image processing. Similarly, due to compression and bandwidth constraints, the real-time imaging content may not provide enough detail to allow the inspector to make an assessment. The low resolution imaging content, however, typically allows the inspector to see gross structural deficiencies upon which he or she may follow up post flight by analyzing the high quality video and/or stills captured and stored onboard the UAS. After the fight, the UAS and/or operator can communicate and/or upload the high quality video and/or stills captured by the UAS for further analysis by the inspector and/or other inspectors. Again, the imaging content can be of an interior and/or exterior of the structure.

In some embodiments, the UAS can further be used for hyperspectral capture (e.g., to perform a building/equipment energy audit). A structure can be identified that is to undergo hyperspectral data collection to perform an energy audit. An operator goes to the structure and sets up the UAS. The UAS typically remains proximal (<1 km) to the operator but may be operated beyond line of sight as the operator will have a video feed and telemetry data from the UAS. The imaging content and/or other sensor data can be distributed by the distribution system including providing the hyperspectral feed from the UAS to multiple participants that are not collocated. Post flight processing can be performed on the imaging content and/or the data collected by one or more sensors to allow for the discovery of one or more conditions and/or deficiencies, such as but not limited to hot/cold leaks, inefficient glass, hot/cold spots on HVAC equipment indicating inefficiencies, and other such conditions.

Further, some embodiments use hyperspectral data capture, other sensor data and/or imaging content to compute a high resolution structure model. In post processing the data collected will allow for the creation of a high resolution 3D measurable model. This model would have many uses including but not limited to an adjunct to exiting 2D architectural drawings, a model can be generated after a weather event (tornado, strong winds, earthquake) and compared to a baseline model, looking for any deltas between the two (i.e. shifted HVAC units, pipes, etc.), and other such modeling.

Further, some embodiments provide for remote inspection systems that include a transceiver, a control circuit, and memory coupled to the control circuit and storing computer instructions that when executed by the control circuit cause the control circuit to perform the steps of: receive imaging content, captured by a camera of an unmanned aircraft system (UAS), of a structure being inspected as the UAS flies about the structure; communicate, to the UAS while the UAS is flying about the structure, a navigation command to cause the UAS to fly in accordance with at least the navigation command; and communicate over a distributed communication network the imaging content to a remote display system configured to render the imaging content allowing an inspector to visually inspect at least portions of the structure, wherein the inspector is remote from the structure. The control circuit in communicating the navigation command can cause the UAS to deviate from a preprogrammed flight path and capture additional imaging content while deviating from the preprogrammed flight path. IN some implementations, the control circuit continues to cause the communication of the imaging content in real time while the UAS is in flight and capturing the imaging content of the structure, and navigation command can be communicated in response to an instruction received from the remote inspector. Some embodiments further receive, from the UAS, additional sensor data captured by one or more sensors of the UAS, and communicate the additional sensor data over the distributed communication network to the one or more remote rendering systems causing the remote rendering systems to provide the user with access to additional sensor data as part of the inspection of the at least the portion of the structure.

In some embodiments, systems, apparatuses and methods are provided to capture and distribute imaging content captured by a UAS to be viewed relative to one or more tasks. Some embodiments, provide remote inspection systems comprising: an unmanned aircraft system (UAS) base station control system that wirelessly communicates with an UAS to provide control signals to the UAS in controlling flight of the UAS, wherein the base station control system comprises: a wireless transceiver; a control circuit communicatively coupled with the transceiver; and a memory coupled to the control circuit and storing computer instructions that when executed by the control circuit cause the control circuit to perform the steps of: receive imaging content, captured by a camera of the UAS and processed by the UAS while the UAS is in flight and performing an assigned task; establish a network connection over a distributed communication network with a remote networked content distribution system and activate a distribution session through the content distribution system; and communicate over the distributed communication network the imaging content to the remote networked content distribution system that enables multiple remote authorized rendering systems to access the networked content distribution system over the Internet, join the distribution session, and receive over the Internet in real time the imaging content allowing each of the rendering systems to visually play back the imaging content such that a user at each of the multiple rendering systems can watch the imaging content in real time.

Some embodiments provide methods of capturing and distributing imaging content, comprising: receiving, through a wireless transceiver of a base station control system and from an unmanned aircraft system (UAS), imaging content captured by a camera of the UAS and processed by the UAS while the UAS is in flight and performing an assigned task; establishing a network connection over a distributed communication network with a remote networked content distribution system and activating a distribution session through the content distribution system; and communicating over the distributed communication network the imaging content to the remote networked content distribution system and enabling multiple remote authorized rendering systems to access the networked content distribution system over the Internet, join the distribution session, and receive over the Internet in real time the imaging content allowing each of the rendering systems to visually play back the imaging content such that a user at each of the multiple rendering systems can watch the imaging content in real time.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A remote inspection system, comprising:
an unmanned aircraft system (UAS) base station control system of a plurality of separate and distributed base station control systems, wherein the base station control system is configured to wirelessly communicate with an UAS to provide control signals to the UAS in controlling flight of the UAS, wherein the base station control system comprises:
a wireless transceiver;
a control circuit communicatively coupled with the transceiver; and
a memory coupled to the control circuit and storing computer instructions that when executed by the control circuit cause the control circuit to perform the steps of:
receive imaging content captured by a camera of the UAS and processed by the UAS while the UAS is in flight and performing an assigned task;
receive sensor data captured in real time by sensor systems of the UAS while performing the task;
determine, based on at least some of the imaging content, a basic shape of an area for which imaging content is to be captured by the UAS, determine based on the determined basic shape a route relative to the basic shape along which the UAS is to travel while capturing the imaging content, and direct the UAS to implement controls to travel along the determined route while continuing to capture the imaging content;
establish a network connection over a distributed communication network with a remote networked content distribution system and activate a distribution session through the content distribution system causing the remote networked content distribution system, which is separate and remote from the base station control system, to establish the distribution session, which is accessible over the Internet and through the networked content distribution system by numerous different and remote devices and to contact at least one user of interest associated with the distribution session, wherein the activated distribution session is specifically associated with the imaging content received from the base station control system and is distinct from one or more other distribution sessions accessible through the networked content distribution system, and to cause a three-dimensional (3D) model to be generated based on the imaging content and the sensor data; and
communicate over the distributed communication network the imaging content to the remote networked content distribution system that enables multiple different and remote authorized rendering systems to simultaneously access the networked content distribution system over the Internet, join the distribution session, and receive over the Internet in real time the imaging content allowing each of the rendering systems to visually play back the imaging content such that a user at each of the multiple rendering systems can watch the imaging content in real time.

2. The system of claim 1, wherein the plurality of base station control systems comprise:
hundreds of additional base station control systems each in wireless communication with a separate corresponding UAS, wherein each of the hundreds of base station control systems are configured to:
establish a separate network connection over the distributed communication network with the remote networked content distribution system and activate separate distribution sessions through the content distribution system that are exclusively associated with that corresponding additional base station control system and are separately accessible with different authorizations by authorized rendering systems; and
communicate over the distributed communication network additional imaging content captured by the corresponding UAS to the remote networked content distribution system that enables hundreds of sets of one or more remote authorized additional rendering systems to access one of the additional imaging content that the rendering system has been authorized to access over the Internet, join the corresponding distribution session, and receive over the Internet in real time the authorized one of the additional imaging content allowing each of the additional rendering systems to visually play back the authorized one of the imaging content and a user at each of the multiple rendering systems to watch the corresponding additional imaging content in real time.

3. The system of claim 2, wherein the imaging content comprises imaging content captured by the UAS while the UAS is in a process of delivering a previously purchased product to a customer, and a first rendering system associated with the customer is authorized to access the distribution session enabling the customer to view the imaging content of the delivery of the product in real time through the first rendering system.

4. The system of claim 1, wherein the imaging content, captured by the camera of the UAS, comprises imaging content of a structure being inspected by a remote expert as the UAS flies about the structure capturing the imaging content;
wherein the remote inspector views the imaging content through the distribution session enabling remote inspection of the structure in real time.

5. The system of claim 4, wherein the control circuit is further configured to receive a remote navigation instruction from a first rendering system associated with the remote inspector, and to communicate, to the UAS while the UAS is flying about the structure, a navigation command corresponding to the navigation instruction to cause the UAS to deviate from an intended flight path in accordance with at least the navigation command.

6. The system of claim 5, wherein the control circuit in communicating the navigation command comprises causing a communication of the navigation command that causes the UAS to deviate from a preprogrammed flight path and capture additional imaging content while deviating from the preprogrammed flight path.

7. The system of claim 4, wherein the control circuit is further configured to receive, from the UAS, additional sensor data captured by a sensor of the UAS; and
communicate the additional sensor data over the distributed communication network to the content distribution system to be distributed as part of the distribution session, and causing a first remote rendering system associated with the inspector to provide the inspector with access to additional sensor data as part of the inspection of the at least the portion of the structure.

8. The system of claim 7, wherein the control circuit in receiving the additional sensor data receives hyperspectral sensor data detected by a hyperspectral sensor on the UAS, and communicates the hyperspectral sensor data to the networked content distribution system to be accessible through the distribution session.

9. The system of claim 1, wherein the control circuit is configured to cause the UAS to process original imaging content captured by the camera of the UAS to generate the imaging content at a lower resolution than the original imaging content, cause the UAS to wirelessly communicate the imaging content, cause the UAS to locally store the higher resolution original imaging content on the UAS for later retrieval and distribution, receive the original imaging content in the higher resolution from the UAS after the UAS has completed capturing the original imaging content and after the UAS previously communicated the lower resolution imaging content.

10. The system of claim 1, wherein the control circuit in is configured to communicate an identifier of the base station control system utilized by the networked content distribution system to identify the distribution session and associate the imaging content with the distribution session.

11. The system of claim 1, further comprising the UAS wherein the UAS autonomously implements a preprogrammed flight path that causes the UAS to travel along a length of the structure at a first elevation, change to a second elevation based on a field of view of the camera, and travel along the length of the structure while at the second elevation.

12. A method of capturing and distributing imaging content, comprising:
receiving, through a wireless transceiver of a base station control system of a plurality of separate and distributed base station control systems and from an unmanned aircraft system (UAS), imaging content captured by a camera of the UAS and processed by the UAS while the UAS is in flight and performing an assigned task;
receiving sensor data captured in real time by sensor systems of the UAS while performing the task;
determining, based on at least some of the imaging content, a basic shape of an area for which imaging content is to be captured by the UAS;
determining based on the determined basic shape a route relative to the basic shape along which the UAS is to travel while capturing the imaging content;
directing the UAS to implement controls to travel along the determined route while continuing to capture the imaging content;
establishing a network connection over a distributed communication network with a remote networked content distribution system and activating a distribution session through the content distribution system causing the remote networked content distribution system, which is separate and remote from the base station control system, to establish the distribution session, which is accessible over the Internet and through the networked content distribution system by numerous different and remote devices and to contact at least one user of interest associated with the distribution session, wherein the activated distribution session is specifically associated with the imaging content received from the base station control system and is distinct from one or more other distribution sessions accessible through the networked content distribution system;
causing a three-dimensional (3D) model to be generated based on the imaging content and the sensor data; and
communicating over the distributed communication network the imaging content to the remote networked content distribution system and enabling multiple different and remote authorized rendering systems to simultaneously access the networked content distribution system over the Internet, join the distribution session, and receive over the Internet in real time the imaging content allowing each of the rendering systems to visually play back the imaging content such that a user at each of the multiple rendering systems can watch the imaging content in real time.

13. The method of claim 12, further comprising:
establishing, through each of hundreds of additional base station control systems of the plurality of base station control systems each in wireless communication with a separate corresponding UAS, a separate network connection over the distributed communication network with the content distribution system and activating separate distribution sessions through the content distribution system that are exclusively associated with that corresponding additional base station control system and are separately accessible with different authorizations by authorized rendering systems; and communicating, by each of the hundreds of additional base station control systems and over the distributed communication network, additional imaging content captured by each of the corresponding UASs to the remote networked content distribution system which enables hundreds of sets of one or more remote authorized additional rendering systems to access one of the additional imaging content that the rendering system has been authorized to access over the Internet, join the corresponding distribution session, and receive over the Internet in real time the authorized one of the additional imaging content allowing each of the additional rendering systems to visually play back the authorized one of the imaging content and a user at each of the multiple rendering systems to watch the corresponding additional imaging content in real time.

14. The method of claim 13, wherein communicating the imaging content comprises communicating the imaging content comprising imaging content captured by the UAS while the UAS is in a process of delivering a previously purchased product to a customer, wherein a first rendering system associated with the customer is authorized to access the distribution session enabling the customer to view the imaging content of the delivery of the product in real time through the first rendering system.

15. The method of claim 12, wherein the activating the distribution session comprises enabling access by a remote rendering system associated with a remote inspection expert to the imaging content comprising imaging content of a structure being inspected by the remote expert as the UAS flies about the structure capturing the imaging content;
wherein the remote inspector views the imaging content through the distribution session enabling remote inspection of the structure in real time.

16. The method of claim 15, further comprising:
receiving a remote navigation instruction from the remote rendering system associated with the remote inspector; and
communicating, to the UAS while the UAS is flying about the structure, a navigation command corresponding to the navigation instruction to cause the UAS to deviate from an intended flight path in accordance with at least the navigation command.

17. The method of claim 16, wherein the communicating the navigation command comprises communicating the navigation command that causes the UAS to deviate from a preprogrammed flight path and to capture additional imaging content while deviating from the preprogrammed flight path.

18. The method of claim 15, further comprising:
receiving, from the UAS, additional sensor data captured by a sensor of the UAS;
communicating the additional sensor data over the distributed communication network to the content distribution system to be distributed as part of the distribution session; and
causing a remote rendering system associated with the inspector to provide the inspector with access to the additional sensor data as part of the inspection of the at least the portion of the structure.

19. The method of claim 18, wherein the receiving the additional sensor data comprises receiving hyperspectral sensor data detected by a hyperspectral sensor on the UAS; and
the communicating the additional sensor data comprises communicating the hyperspectral sensor data to the networked content distribution system to be accessible through the distribution session.

20. The method of claim 15, further comprising:
communicating an identifier of the base station control system utilized by the networked content distribution system to identify the distribution session and associate the imaging content with the distribution session.

21. The method of claim 12, further comprising:
causing the UAS to process original imaging content captured by the camera of the UAS to generate the imaging content at a lower resolution than the original imaging content;
causing the UAS to wirelessly communicate the imaging content;
causing the UAS to locally store the higher resolution original imaging content on the UAS for later retrieval and distribution; and
receiving the original imaging content in the higher resolution from the UAS after the UAS has completed capturing the original imaging content and after the UAS previously communicated the lower resolution imaging content.

22. The method of claim 12, further comprising:
autonomously implementing, through the UAS, a preprogrammed flight path that causes the UAS to travel along a length of the structure at a first elevation, change to a second elevation based on a field of view of the camera, and travel along the length of the structure while at the second elevation.

* * * * *

UNITED STATES PATENT AND TRADEMARK OFFICE
CERTIFICATE OF CORRECTION

PATENT NO. : 10,298,664 B2  
APPLICATION NO. : 15/380086  
DATED : May 21, 2019  
INVENTOR(S) : Donald R. High et al.

Page 1 of 1

It is certified that error appears in the above-identified patent and that said Letters Patent is hereby corrected as shown below:

In the Specification

Column 1, Line 10, add the "." after "entirety".

In the Claims

Column 23, Line 66, Claim 10, delete "in" after "circuit".

Signed and Sealed this
Seventeenth Day of September, 2019

Andrei Iancu
*Director of the United States Patent and Trademark Office*